Sept. 10, 1957  L. A. HAMMOND ET AL  2,806,206
ANALTEST PROBE
Filed March 14, 1955
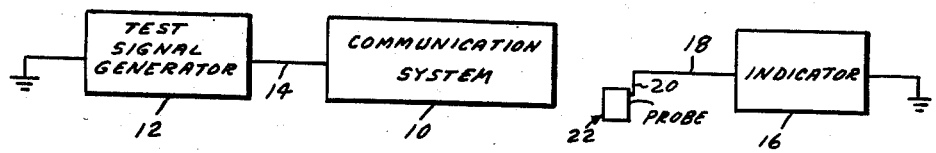
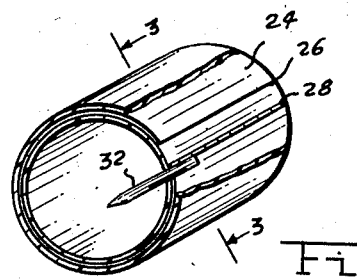
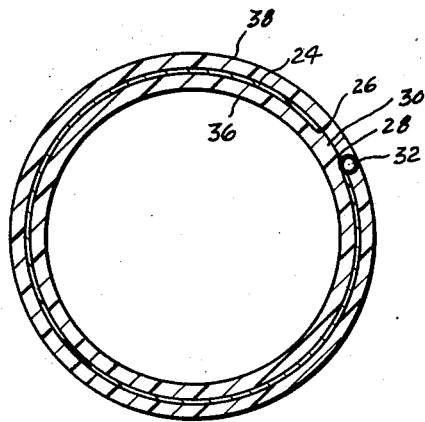
INVENTORS.
LESTER A. HAMMOND
CLARENCE M. DOYLE
BY S. A. Strickled
Wade Koontz
ATTORNEYS

United States Patent Office 2,806,206
Patented Sept. 10, 1957

2,806,206
ANALTEST PROBE

Lester A. Hammond, Las Cruces, N. Mex., and Clarence M. Doyle, Utica, N. Y., assignors to the United States of America as represented by the Secretary of the Air Force Application March 14, 1955, Serial No. 494,300

4 Claims. (Cl. 324—72.5)

(Granted under Title 35, U. S. Code (1952), sec. 266)

The invention described herein may be manufactured and used by or for the United States Government for governmental purposes without payment to us of any royalty thereon.

This invention relates to an analtest probe and particularly to a probe applicable to the electronic device to determine the operating conditions of the circuits supplied thereto.

In the operation of electronic equipment, particularly electronic equipment utilizing various types of tubes, it frequently becomes necessary to analyze the operating conditions of the electronic equipment. It has heretofore been customary to apply various types of probes to the equipment and to utilize indicator devices actuated by currents picked up by the probes to determine the operating characteristics of the electronic devices.

It has been customary to provide conducting probes which may be fitted into contact with various terminals of the electronic device. It is obvious that considerable danger results in the utilization of such probes not only because of the danger of producing short circuits within the electronic equipment but because of possible injury to the analyzer operators by contact with high voltages in the equipment. It has also been known to provide spiral or coil type devices which will telescope over the various electronic tubes and by induction pick up an indication of the current carried thereby. Such probes have been unsatisfactory in that they produce inductive effects in the electronic circuits.

The present invention provides a probe which may be safely applied to the exterior of electronic tubes and which is discontinuous to the current induced therein so that there will be no inductive effect transmitted to the electronic circuit and such may be properly insulated to protect not only the electronic circuit but also to protect the operator thereof.

In the probe construction, according to the invention, a plate of conducting material particularly of cuprous character is formed into a substantially tubular body with the edges in spaced relation and the entire hollow tube encased in insulating material and having a connecting pin conductively connected to the plate and extending outside of the insulating material.

It is accordingly an object of the invention to provide an analtest probe.

It is a further object of the invention to provide an insulated probe applicable to electronic tubes.

It is another object of the invention to provide a probe which may be applicable to electronic tubes without disturbing the induction effects therein.

It is a still further object of the invention to provide a cheap, efficient and easily constructed probe.

Other objects and attendant advantages of the present invention will be readily apparent from the following detailed specification taken in conjunction with the accompanying drawing in which:

Figure 1 is a block diagram of a system for utilizing the probe according to the invention;

Figure 2 is a perspective view of the probe with parts broken away and in section; and Figure 3 is a cross-section through the probe taken substantially on the plane indicated by the line 3—3 of Figure 2.

In the exemplary embodiment according to the invention, an electronic device, such as a communication system 10, will as is customary contain a plurality of electronic tubes not shown.

The test equipment for analyzing the operation of the electronic system will comprise a test signal generator 12 which will be connected to the communication system by any suitable conductor 14 and an indicator device of any suitable type, indicated generally at 16, will be provided with a conductor 18 which will be connected to a conductor pin 20 on the special probe 22 which is adapted to be telescopingly engaged over the various electronic tubes in the system 10.

Probe 22 comprises a platelike member 24 formed into a substantially cylindrical member having the edges 26 and 28 spaced apart to provide a discontinuity 30 extending longitudinally of the hollow cylinder formed by the plate 24 so as to prevent circulating currents from voltages produced in the plate member 24. A connecting pin 32 is secured in conducting relation to the plate 24 and both the plate 24 and the pin 32 are preferably constructed of any suitable conducting material such as copper or cuprous material.

The surfaces of the hollow cylinder 24 are provided with an insulating coating 36 on the inner surface thereof, and an insulating coating 38 on the outer surface thereof with the coatings 36 and 38 joined together to form an insulating cylinder completely enclosing or embedding the conducting cylinder formed from the plate 24. The insulating cylinder may be continuous across the gap or discontinuity 30, or, if desired, the insulating cylinder may also have a gap so that the composite probe may be resilient.

In the utilization of the probe the conductor 18 will be connected to the pin 32 and the cylindrical probe will be extended in telescoping relation with any desired electronic tube of the device and the indicating device 16 will indicate the operating condition in that particular tube. The probes may be further utilized by providing a plurality of probes and connecting the probes together by any suitable, preferably flexible, conductor, so that the probes may be applied to various tubes to effectively short out the portion of the electronic equipment between the probes so that the location of malfunctioning portions of the equipment may be readily located.

For purposes of exemplification a particular embodiment of the invention has been shown and described according to the best present understanding thereof. However, it will be apparent to those skilled in the art that various changes and modifications in the construction and arrangement of the parts thereof may be readily resorted to without departing from the true spirit and scope of the invention.

We claim:

1. A test probe comprising a hollow cylinder of electrical conducting material adapted to be telescopically engaged over an electronic tube to be tested, said cylinder having a longitudinal discontinuity therein, a connecting member secured to said cylinder.

2. A test probe comprising a hollow cylinder of electrical conducting material, said cylinder having a longitudinal discontinuity therein, a connecting member secured to said cylinder, a hollow cylinder of electrical insulating material, said cylinder of conducting material being imbedded in said cylinder of insulating material, said hollow cylinder of insulating material being adapted to telescopically engage an electron tube to position said cylinder of conducting material in capacitive coupling relation to the electron tube.

3. A test probe comprising a hollow cylinder of electrical conducting material adapted to be telescopically engaged in capacitive pickup relation with an electron tube, said cylinder having a longitudinal discontinuity therein, a connecting member secured to said cylinder, an insulating coating applied to the surfaces of said cylinder of conducting material, said insulating coating completely enclosing said cylinder.

4. A test probe comprising a plate of cuprous material formed into a hollow cylinder, the edges of said plate being spaced apart to provide a longitudinal discontinuity in said hollow cylinder, a connecting pin secured in conducting relation with said plate, a coating of insulating material on the surfaces of said plate, said coating constituting a hollow insulating cylinder surrounding said plate and adapted to engage an electron tube to position said plate in pickup relation to the tube, said pin extending beyond said insulating cylinder.

References Cited in the file of this patent

UNITED STATES PATENTS

| | | |
|---|---|---|
| 1,867,901 | Walter | July 19, 1932 |
| 2,019,939 | Suller | Nov. 5, 1935 |
| 2,602,914 | Schlesman et al. | July 8, 1952 |
| 2,702,878 | Heibel | Feb. 22, 1955 |
| 2,759,144 | Whyman | Aug. 14, 1956 |